T. C. DUNCANSON.
DUMPING-WAGON.
No. 194,589. Patented Aug. 28, 1877.
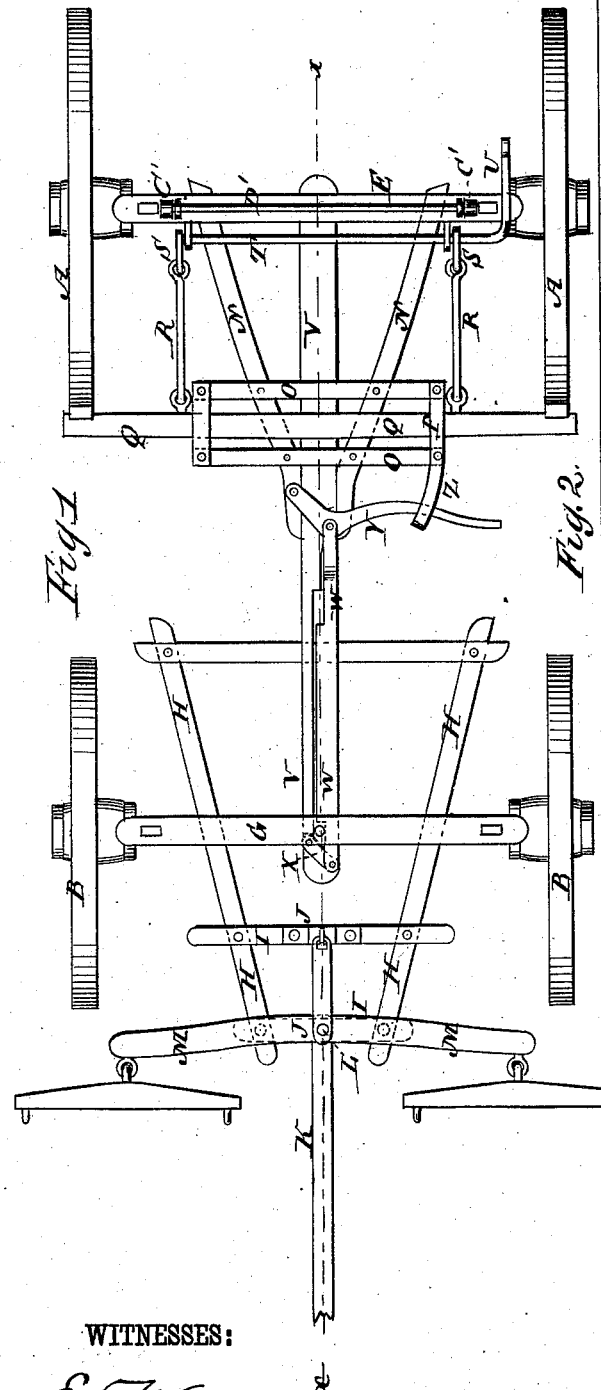
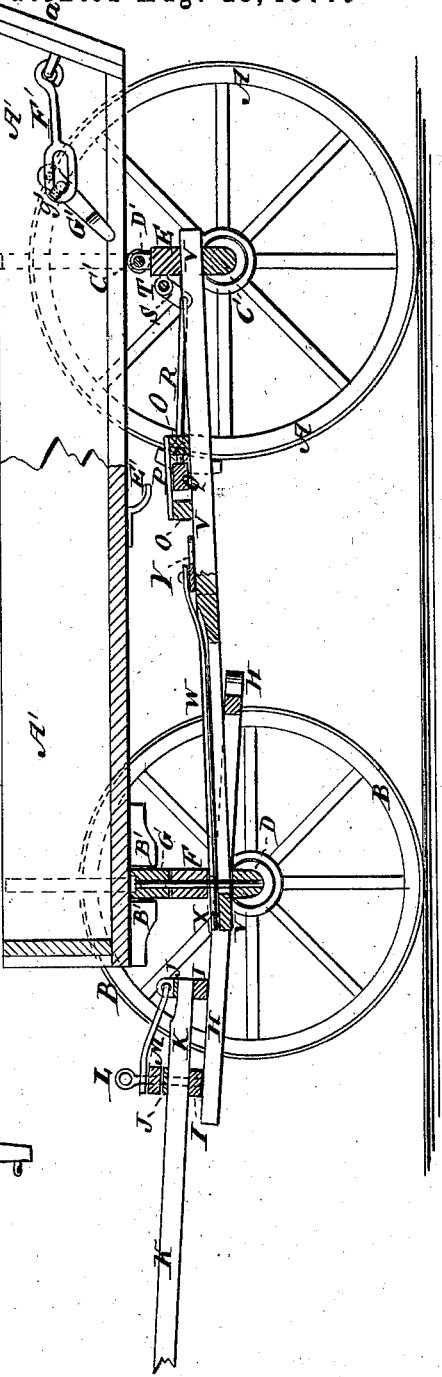
WITNESSES:
E. Wolff
J. H. Scarborough
INVENTOR:
T. C. Duncanson
BY Munn & Co.
ATTORNEYS.

UNITED STATES PATENT OFFICE.

THOMAS C. DUNCANSON, OF JEFFERSONVILLE, OHIO.

IMPROVEMENT IN DUMPING-WAGONS.

Specification forming part of Letters Patent No. 194,589, dated August 28, 1877; application filed June 30, 1877.

*To all whom it may concern:*

Be it known that I, THOMAS CORWIN DUNCANSON, of Jeffersonville, in the county of Fayette and State of Ohio, have invented a new and useful Improvement in Dumping-Wagons, of which the following is a specification:

Figure 1 is a top view of the running-gearing of one of my improved wagons, the box being removed. Fig. 2 is a vertical longitudinal section of the same, the box being shown partly in side view and partly in section.

Similar letters of reference indicate corresponding parts.

The object of this invention is to furnish wagons which shall be so constructed that the box may be tilted to dump the load by the movement of the team, and which shall be simple in construction and convenient in use.

The invention will first be described in connection with the drawings, and then pointed out in the claims.

A A are the rear wheels. B B are the fore wheels. C is the rear axle. D is the forward axle. E is the rear bolster. F is the sand-board, and G is the forward bolster. H H are the forward hounds, to the upper side of the forward parts of which are attached the cross-bars I.

To the upper sides of the cross-bars I are attached keepers J, to receive the tongue K, which is secured detachably in place by the hammer-bolt L, which pivots the double-tree M to said tongue. By this construction the tongue K will be raised to, or nearly to, the level of the bottom of the wagon-box.

N N are the rear hounds, to the upper side of the forward part of which are attached cross-bars O, the ends of which have straps P attached to their upper sides. The bars and straps O P thus serve as guides and keepers for the brake-bar Q.

To the rear side of the brake-bar Q are pivoted the forward ends of two rods, R, the rear ends of which are pivoted to the ends of two crank-arms, S, attached to or formed upon the shaft T. The shaft T works in bearings attached to the forward side of the rear bolster E, and upon its end is formed or to it is attached a lever, U, by the movement of which the brake is applied.

V is the reach, the rear part of which is secured to the rear hounds N, and the forward part of which passes between the forward axle D and the sand-board F, and is slotted longitudinally to receive the king-bolt.

W is a bar placed upon the reach V at the side of its slot, and having its forward end pivoted to a short bar, X, the other end of which is pivoted to the forward end of the reach V, at the other side of its slot.

The rear end of the bar W is pivoted to the lever Y, the end of which is pivoted to the reach V or to its hounds N at the side of said reach. The other end of the lever Y passes through a catch-loop or across a catch-bar, Z, attached to the ends of the bars O. The inner edge of the latch-bar W, near its ends, is notched to receive the king-bolt to lock the parts of wagon-gearing in place when adjusted wider apart or closer together.

A' represents the wagon-box, to the forward part of the bottom of which are attached blocks B', to receive the forward bolster G between them, and thus keep the wagon-box from slipping forward or back.

The rear part of the box A' rests upon small rollers C', attached to or formed upon a rod, D', that revolves in keepers attached to the upper side of the rear bolster E.

The part of the bottom of the box A' that rests and moves upon the rollers C' should be plated with iron, or should have bars plated with iron attached to it, to prevent wear.

To the bottom of the box A', a little in front of its center, is attached a hook or open keeper, E', to catch upon the rod D', and prevent the box A' from slipping off the rear bolster E, when tilted to dump the load.

To the inner side of the end parts of the rear end board a' are attached cleats, to form grooves to receive the rear ends of the side-boards of the wagon-box A'.

To the ends of the end board a' are pivoted links or hasps F', which are passed over hook-pins g', attached to the sides of the levers G', at a little distance from their ends, so that by turning the levers G' to bring the hooks of their pins g' toward the rear end of the box A' the hasps or links F' will slip off and the rear end board will be detached. The end board a' is secured in place by passing the links or hasps F' over the hook-pins g' of the levers G', and turning the said levers to bring the hooks of their said pins forward, as shown in Fig. 2.

With this construction, when the load is to be dumped the wagon is brought to the desired place, the lever V is operated to withdraw the bar W from the king-bolt, the brake is applied to the rear wheels A, and the team is backed. This causes the forward part of the wagon-gearing to move back toward its rear part, the box A' moving back upon the rollers C' of the rod D'. As the center of gravity of the box A' passes the bolster E the box A' tilts, and the load is dumped. The hook E', catching upon the rod D', prevents the box A' from sliding off the bolster E. The box A' may then be tipped back, the team started forward, and the lever Y operated to lock the king-bolt in place when it reaches the forward end of the slot in the reach V. The end-board a' is then secured in place, and the wagon is ready to receive another load.

Having thus described my invention, I claim as new and desire to secure by Letters Patent—

1. The combination of the notched bar W, the connecting bar or link X, the lever Y, and the catch bar or loop Z, with the slotted reach V, for locking and releasing the king-bolt, substantially as herein shown and described.

2. The combination of the links or hasps F' and the levers G', provided with the hook-pins g', with the end-board a' and the side-boards of the wagon-box A', substantially as herein shown and described.

THOMAS C. DUNCANSON.

Witnesses:
CASSIUS MOCK,
JOSEPH HURLESS.